(No Model.)

A. W. RUMSEY.
CLEVIS.

No. 353,506. Patented Nov. 30, 1886.

WITNESSES:
Donn Twitchell
C. Sedgwick

INVENTOR:
A. W. Rumsey
BY Munn & Co
ATTORNEYS.

UNITED STATES PATENT OFFICE.

ARTHUR W. RUMSEY, OF NEW KIOWA, KANSAS.

CLEVIS.

SPECIFICATION forming part of Letters Patent No. 353,506, dated November 30, 1886.

Application filed April 20, 1886. Serial No. 199,522. (No model.)

*To all whom it may concern:*

Be it known that I, ARTHUR W. RUMSEY, of New Kiowa, in the county of Barber and State of Kansas, have invented a new and Improved Clevis, of which the following is a full, clear, and exact description.

My invention relates to that class of draft devices known as "clevises" and adapted for attachment to agricultural implements or other machines or to vehicles, and has for its object to provide a simple, inexpensive, and effective clevis which may be quickly and easily connected to or disconnected from the implement or machine and will not uncouple therefrom accidentally.

The invention consists in certain novel features of construction and combinations of parts of the clevis, all as hereinafter fully described and claimed.

Reference is to be had to the accompanying drawings, forming a part of this specification, in which similar letters of reference indicate corresponding parts in both the figures.

Figure 1:
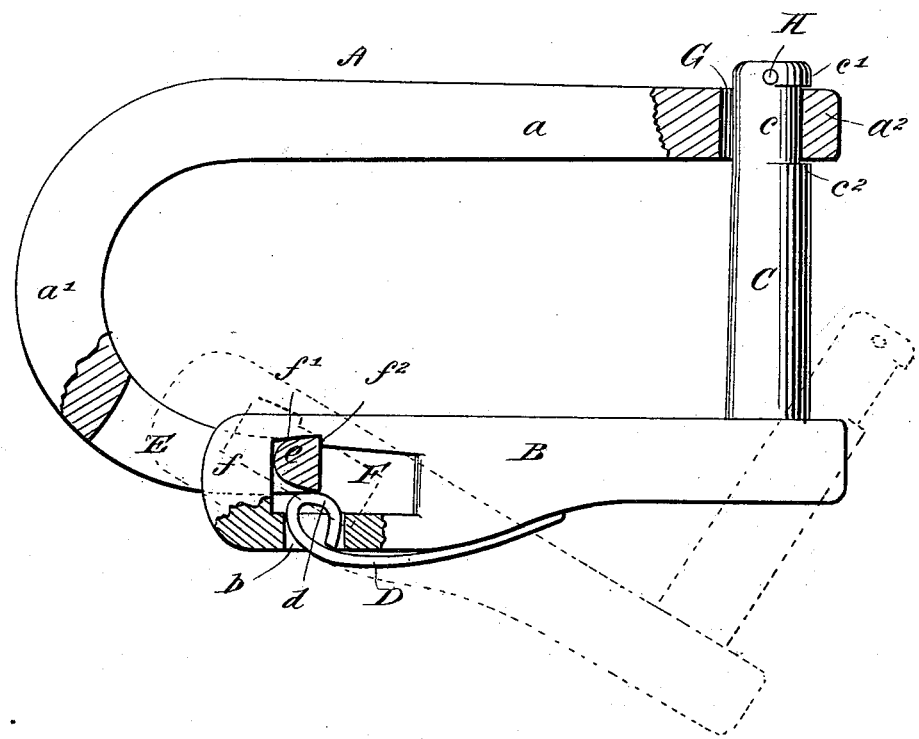
Figure 2:
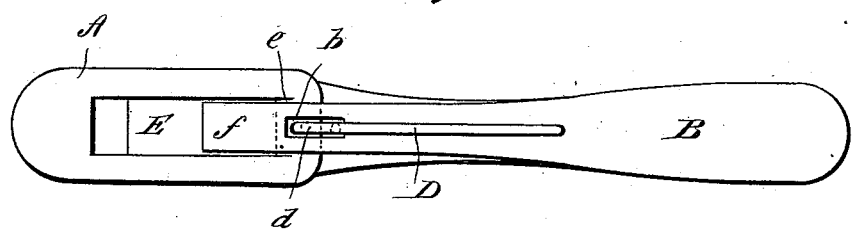

Figure 1 is a side view of my improved clevis, partly broken away and in section; and Fig. 2 is a bottom edge view of the clevis.

The clevis has four main parts—a bar, A, a bar, B, a pin, C, and a spring, D.

The bar A has a straight part, $a$, which is the top of the clevis, and a bent or curved part, $a'$, which is the forward end of the clevis, and near the extremity of the part $a'$ is formed a slot, E, thus providing an end cross-piece, $e$. The forward end of the bar B is provided with a horizontally-ranging slot, F, into which the cross-piece $e$ of bar A passes, while the end cross-piece, $f$, of bar B enters the vertically-ranging slot E of bar A, and whereby the parts A B will be loosely connected or linked together.

At the forward end and upper side of the slot F of bar B there is formed a recess, $f'$, providing a shoulder at $f^2$, against which the end of the cross-piece $e$ of bar A is adapted to lock, and the spring D, which is fixed at one end to the bar B, has at its other end an in-bent eye or loop, $d$, which passes through a slot, $b$, of the bar B and presses against the cross-piece $e$ to hold it in the recess $f'$, and in front of the shoulder $f^2$, and thus hold the parts A B together, as shown in Fig. 1, when the pin C is engaged with the bar A, as next described.

The draft-pin C is rigidly fixed in or to the back end of the bar B, and its extremity may be passed into a hole, G, made through the bar A, and near its top the pin C is cut away to form a recess, $c$, the end shoulders, $c'$ $c^2$, of which pass above and below the bar A, when the bar B and pin C are moved backward after the pin is passed into the hole G, as will be understood from Fig. 1 of the drawings.

A retaining-pin or cotter, H, may be passed through the pin C, above the bar A, if preferred, to make the connections of the parts A B at the slots E F, as in Fig. 1, more secure.

It is obvious that if the pin H, when used, be removed, and the cross-piece $e$ of bar A be depressed against the tension of the spring D until the cross-piece escapes from the shoulder $f^2$ of bar B, the bar B and pin C then may be moved forward sufficiently to disengage the shoulders $c'$ $c^2$ from the back end piece, $a^2$, of bar A, behind the hole G, and the pin C may be withdrawn from hole G as the bar B swings downward on the cross-piece $e$ of bar A, and as indicated in dotted lines in Fig. 1, to allow the draft-pin C to be slipped into the draft-ring or behind a draft-bar of an agricultural implement or other machine or vehicle, whereupon, by swinging the bar B upward, the pin C may be entered into the hole G, and the shoulders $c'$ $c^2$ of the pin will engage above and below the end piece, $a^2$, of bar A as the end cross-piece, $e$, of bar A is forced upward by the end $d$ of the spring D into engagement with the shoulder $f^2$ of the bar B.

The spring D may be dispensed with when the pin H is used, as the shoulder $f^2$ of bar B would fall by gravity behind the cross-piece $e$ of the bar A, but the spring is necessary when the pin H is not used, and when the spring D and pin H are both used, as shown, said pin H will prevent disengagement of the pin C from the hole G of bar A should the cross-piece $e$ become disengaged from the shoulder $f^2$ by severe shock of the parts A or B against any object when the clevis is in use.

This clevis is adapted for all uses to which a device of this character is applicable.

Having thus fully described my invention, what I claim as new, and desire to secure by Letters Patent, is—

1. A clevis comprising a bar, A, provided with a bent end, $a'$, a slot, E, and a hole, G, a bar, B, provided with a slot, F, and a shoulder, $f^2$, in said slot adapted to engage an end cross-piece, $e$, of bar A, and a pin, C, held rigidly to bar B, and adapted to enter the hole G of bar A, and provided with a side recess, $c$, forming shoulders $c'$ $c^2$, substantially as and for the purposes herein set forth.

2. A clevis comprising a bar, A, provided with a bent end, $a'$, a slot, E, and a hole, G, a bar, B, provided with a slot, F, and a shoulder, $f^2$, in said slot, a pin, C, held rigidly to bar B, and adapted to hole G, and provided with a side recess, $c$, and a removable pin, H, passed through the pin C, outside of the bar A, substantially as herein set forth.

3. The combination of the clevis-bars A B and pin C, said bar A provided with the slot E, cross-piece $e$, and hole G, and said bar B having the slot F, cross-piece $f$, recess $f'$, and shoulder $f^2$, and said pin C fixed at one end to the bar B, and having a recess, $c$, forming shoulders $c'$ $c^2$, engaging the end $a^2$ of bar A, and a spring, as at D, fixed to bar B, and acting on the cross-piece $e$ of bar A to hold it to the shoulder $f^2$, substantially as described, for the purposes set forth.

4. In a clevis, the bars A B, linked together by cross-pieces $e f$, formed by slotting the respective bars vertically and horizontally, as at E F, and said bar B having a shoulder, as at $f^2$, with which the cross-piece $e$ of bar A engages, substantially as herein set forth.

5. In a clevis, the bars A B, linked together by cross-pieces $e f$, formed by slotting the respective bars vertically and horizontally, as at E F, and said bar B having a shoulder, as at $f^2$, and a spring, as at D, holding the cross-piece $e$ of bar A into engagement with the shoulder $f^2$ of bar B, substantially as herein set forth.

ARTHUR W. RUMSEY.

Witnesses:
ANSON J. BENTLEY,
WM. C. MORROW.